United States Patent [19]

Adler

[11] Patent Number: 4,615,037

[45] Date of Patent: Sep. 30, 1986

[54] PHASE SCATTER DETECTION AND REDUCTION CIRCUIT AND METHOD

[75] Inventor: Alan J. Adler, Palo Alto, Calif.

[73] Assignee: Ampex Corporation, Redwood City, Calif.

[21] Appl. No.: 695,995

[22] Filed: Jan. 29, 1985

[51] Int. Cl.[4] .............................................. H03H 7/40
[52] U.S. Cl. ....................................... 375/12; 360/65; 333/28 R
[58] Field of Search ..................... 375/11, 12, 13, 14, 375/15, 16, 97, 99, 118, 119, 120; 333/18, 28 R, 28 T; 360/45, 65; 328/155, 165; 329/118, 122; 381/103; 307/510, 511

[56] References Cited

U.S. PATENT DOCUMENTS

| | | | |
|---|---|---|---|
| 3,048,664 | 10/1957 | Drukey | 360/65 |
| 3,305,798 | 2/1967 | Rappeport | 333/28 |
| 3,335,223 | 8/1967 | Johnnesson et al. | 375/12 |
| 3,564,160 | 2/1971 | Temes | 360/66 |
| 3,573,667 | 4/1971 | Kao | 333/28 |
| 4,110,798 | 8/1978 | Miller et al. | 360/65 |
| 4,229,822 | 10/1980 | Bench | 375/120 |
| 4,263,624 | 4/1981 | Gundry | 360/65 |
| 4,296,445 | 10/1981 | Schowe, Jr. | 360/65 |
| 4,453,256 | 6/1984 | Ryn | 375/15 |
| 4,459,698 | 7/1984 | Yumoto et al. | 375/16 |

FOREIGN PATENT DOCUMENTS 2025682 1/1980 United Kingdom .............. 360/65

OTHER PUBLICATIONS

Schneider "Adaptive Read Signal Equalizer" IBM Technical Disclosure Bulletin, vol. 17, No. 9, Feb. 1975, pp. 2250-2252.

*Primary Examiner*—Robert L. Griffin
*Assistant Examiner*—Stephen Chin
*Attorney, Agent, or Firm*—Elizabeth E. Strnad; Joel D. Talcott

[57] ABSTRACT

Apparatus and method for phase scatter detection and reduction in a digital signal transmitted over a channel, for example a magnetic recording and reproducing channel. The transmitted signal is equalized to compensate for a non-constant amplitude response and/or non-linear phase response of the channel. A bit synchronization circuit, employing a controllable frequency reference clock signal generator and a digital phase detector, provides a reference clock synchronized with the transmitted data. The amount of phase scatter in the equalized signal is determined by monitoring the switching frequency of the phase detector. The equalizer may be adjusted to minimize that frequency, thereby reducing phase scatter.

16 Claims, 8 Drawing Figures

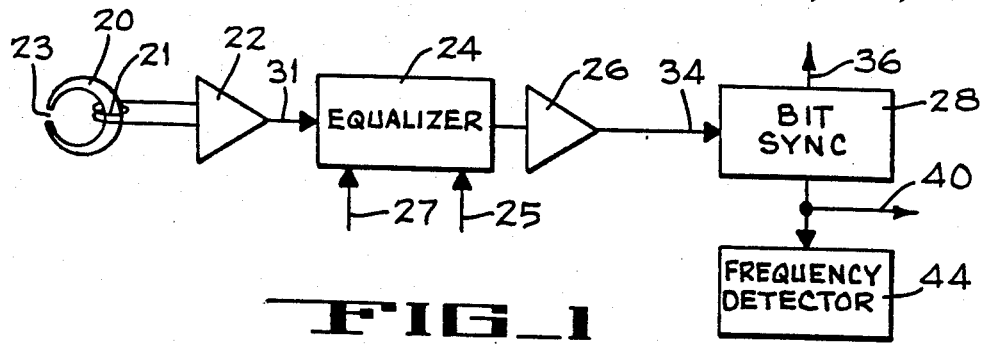
FIG_1
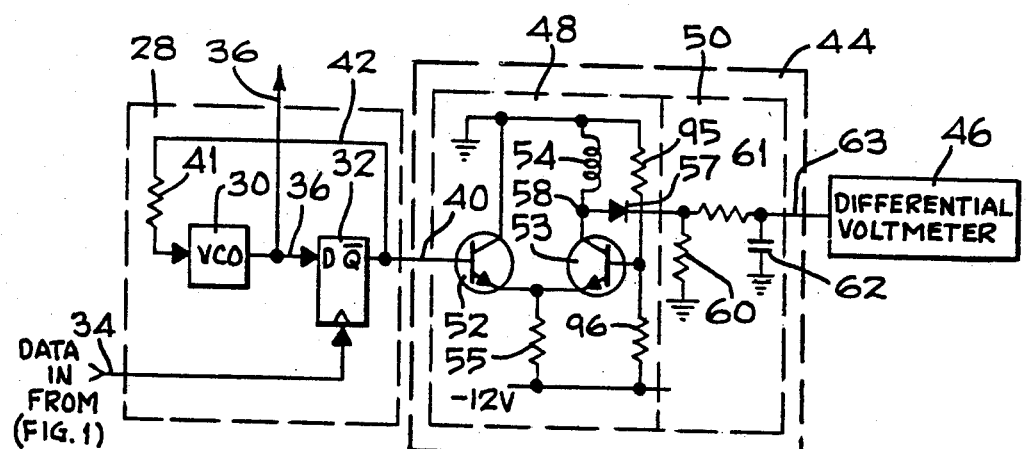
FIG_2
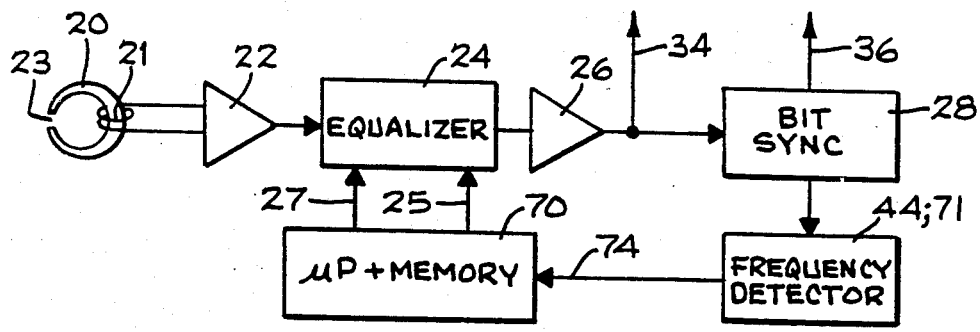
FIG_3

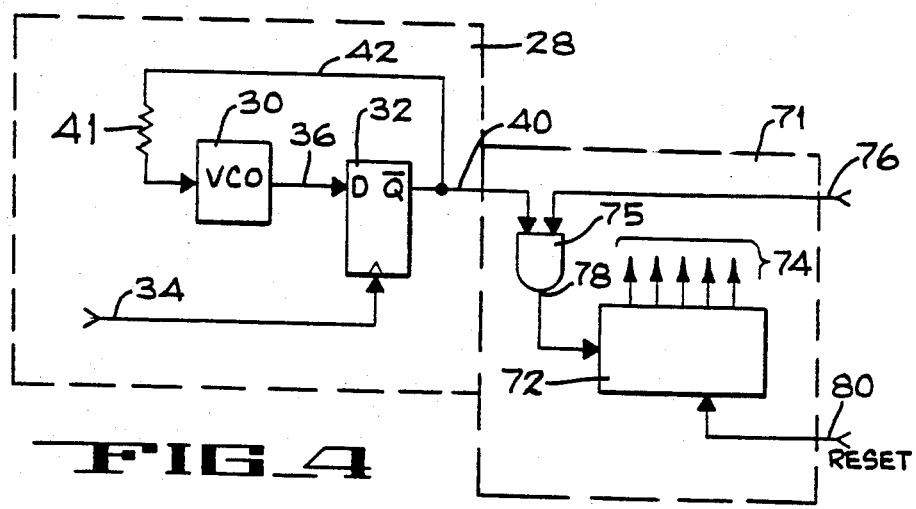
FIG_4
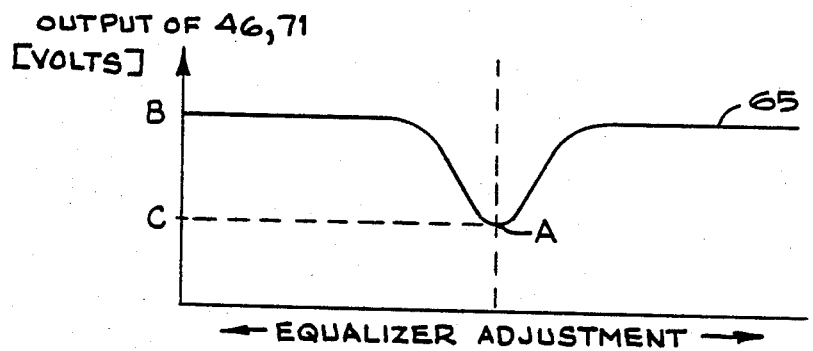
FIG_6

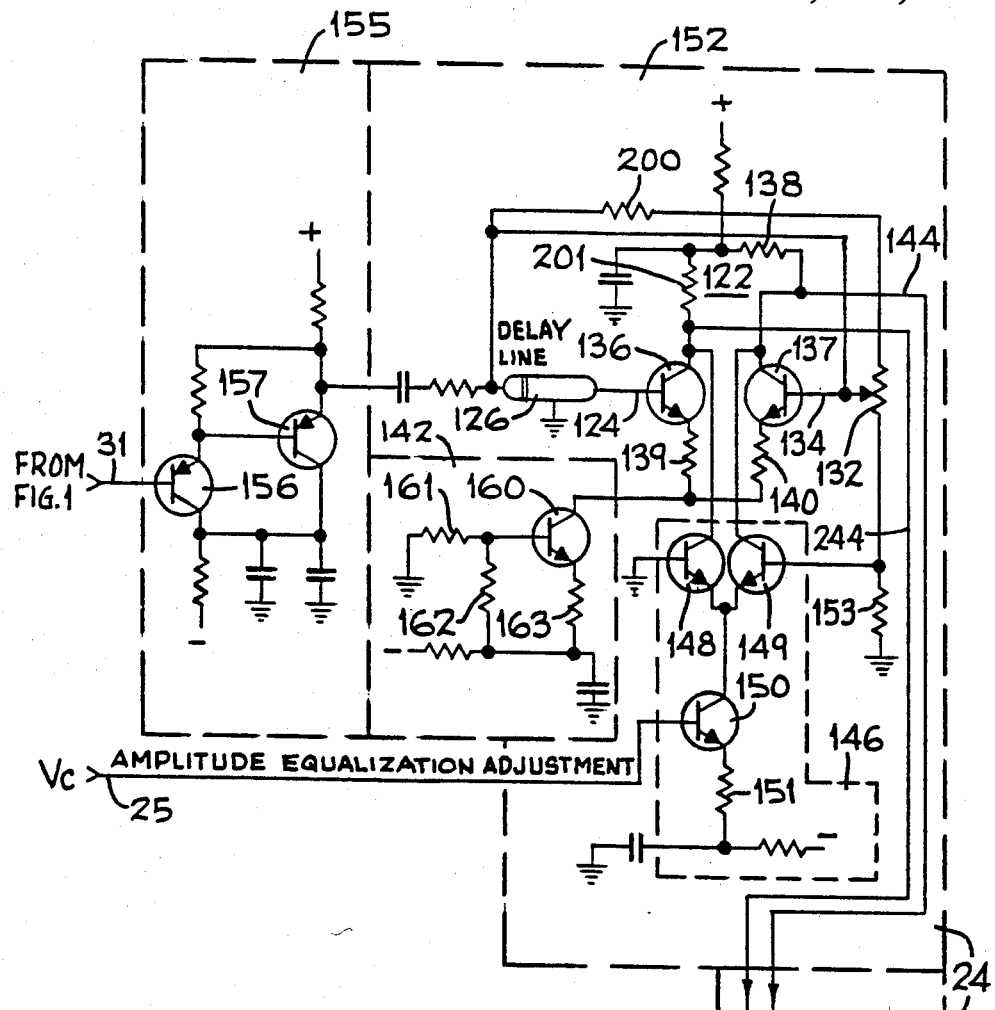
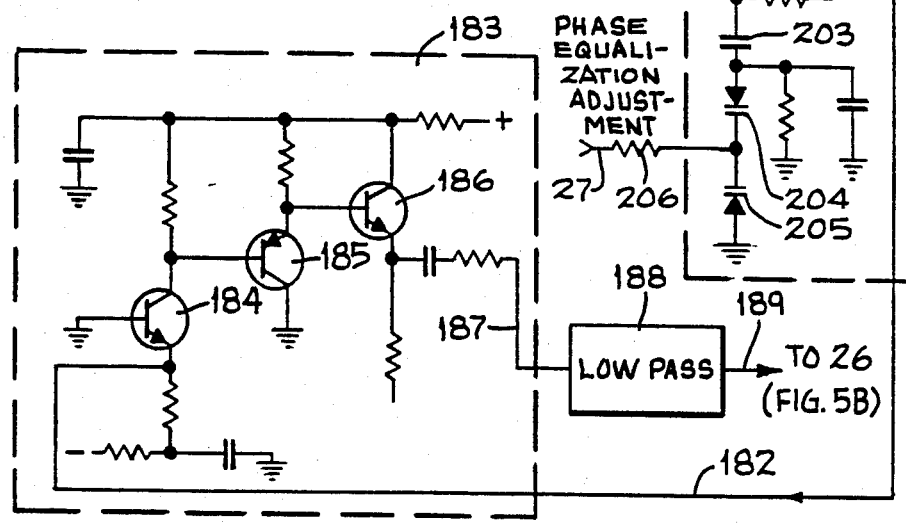
FIG_5A

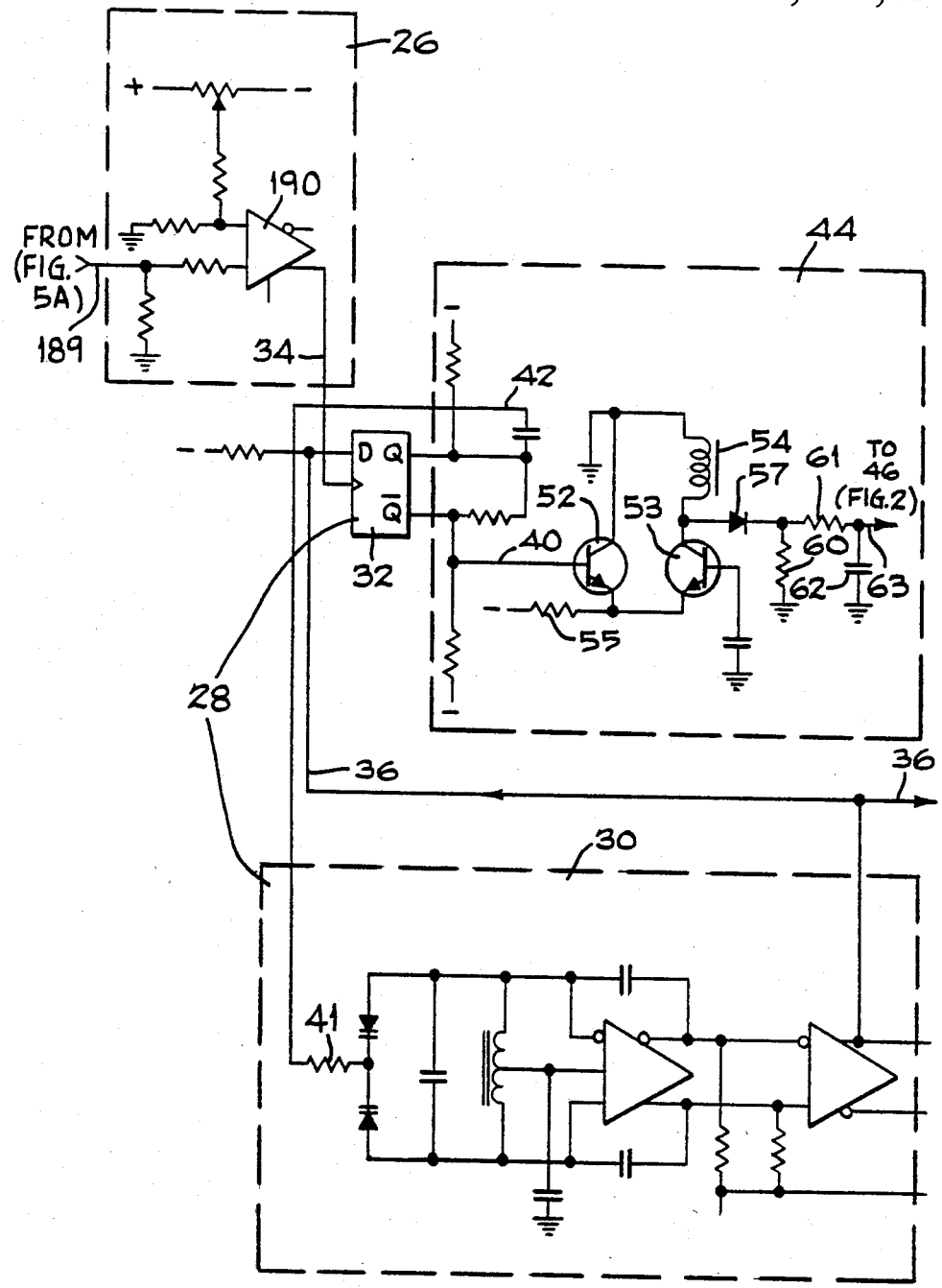
FIG_5B

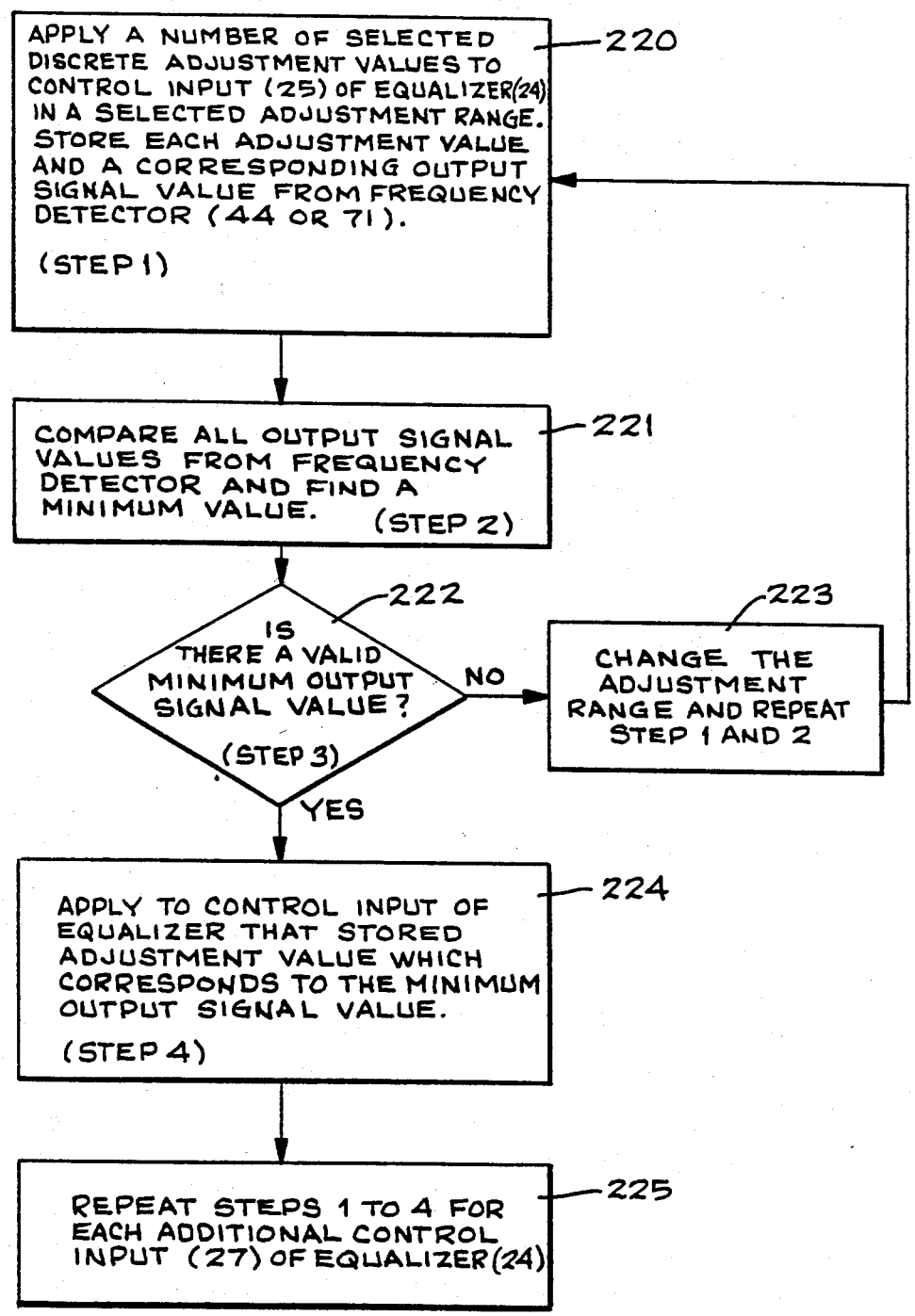
FIG_7

PHASE SCATTER DETECTION AND REDUCTION CIRCUIT AND METHOD

The invention described herein was made in the course of Contract No. 10446-78 awarded by the U.S. Government.

Cross-reference is hereby made to a concurrently filed U.S. patent application Ser. No. 695,994 filed on Jan. 29, 1985 entitled "Voltage Controlled Equalizer", commonly assigned to Ampex Corporation, the assignee of this patent application.

This invention relates in general to a circuit and method for detecting and reducing phase scatter in information signals transmitted over a channel, including digital signals recorded on and reproduced from a magnetic recording medium.

Information signals transmitted over a channel are subject to distortion due to the well known non-constant amplitude response and non-linear phase response with frequency inherent to such channels. When transmitting a digital data stream it may become distorted and attenuated due to the above-indicated non-uniform frequency response to such extent that the original information content may be seriously degraded or even lost.

One example of such signal transmission channel is a magnetic recorder/reproducer, where the playback amplitude response decreases at higher frequencies, due to the combined effects of transducer-to-recording medium separation, thickness of the medium, transducing gap length losses, and other well known factors. A basic requirement for an ideal magnetic recording/reproducing channel is the ability to transmit signals of all frequencies without introducing amplitude or phase changes dependent on frequency to avoid signal distortion. Therefore, it has been a common practice to use playback amplitude equalizers which provide an equalization response compensating for the above-indicated amplitude response so that a resulting relatively flat response can be obtained within a desired frequency range. However, these equalizers, together with a playback head and preamplifier, which are commonly utilized in playback circuits, may introduce phase shift. Such phase shift is particularly undesirable in digital recording/reproducing systems because it obscures accurate detection of signal transitions of the reproduced signal. Therefore amplitude equalizers are often followed by phase equalizers providing an equalization response compensating for the phase shift.

In some instances, it may be desirable to compensate for a previously mentioned non-linear phase response of a channel, by utilizing phase equalizers, without the use of amplitude equalizers.

When high density digital signals are transmitted over an essentially analog communication channel, such as may occur when they are reproduced from a pre-recorded magnetic medium, the equalizer has to be carefully adjusted for minimum phase scatter. Phase scatter occurs when the delay of the transmitted digital data stream is non-uniform over the frequency response band. As a result some signal transitions occur earlier and some others later with respect to signal transitions of a reference clock signal which is synchronous with the original data. This diminishes the ability to accurately distinguish between "zeroes" and "ones" of the transmitted digital signal. For example, when self-clocking digital signals are transmitted or recorded, phase scatter obscures the zero axis crossings upon reception or reproduction, thereby increasing the bit error rate of the signal.

It is known to detect phase scatter on an oscilloscope by monitoring the amplitude and phase relationship of the output signal from a playback equalizer. The oscilloscope is externally triggered by a clock signal phase-locked to the output signal from the equalizer. The thusly obtained signal on the oscilloscope screen is generally referred to as an "eye pattern", because of its shape resembling a human eye. The equalizer is then manually adjusted for minimum phase scatter, that is to obtain zero axis crossings of the eye pattern with the least amount of time spread. When the "sharpest" image of the eye pattern at zero axis crossings is obtained by the manual setting, it corresponds to a minimum phase scatter.

It is seen from the above description that the foregoing method of minimizing phase scatter is inaccurate and subject to operator error. In addition, the above-described method is not useful in systems with low signal-to-noise ratio, where the eye pattern is difficult to distinguish from noise. Furthermore, that method is not suitable for phase scatter adjustment by automatic control.

In digital magnetic recording/playback systems it is known to utilize a so-called bit synchronization circuit, generally referred to as a "bit sync" circuit. It employs a voltage controlled oscillator and a digital phase detector which are connected together to form a phase-locked loop. The phase detector receives an equalized digital data stream from a playback equalizer and an output signal from the oscillator and it provides a clock signal synchronous with that data stream. The applicant has discovered that a minimum phase scatter of the equalized signal is obtained when the output signal frequency of the digital phase detector is at a minimum. Consequently, in accordance with the present invention the amount of phase scatter is detected by monitoring the switching frequency at the output of the digital phase detector. By adjusting the equalizer to obtain a minimum output signal frequency from the phase detector, the phase scatter is minimized.

It is a particular advantage of the phase scatter detection apparatus and method of the present invention that it is not dependent on a subjective evaluation by an operator, such as by observing an eye pattern as has been done in the prior art. Furthermore, the present invention allows for automatic adjustment of the equalizer for minimum phase scatter.

It is a further important advantage of the present invention that it provides repeatable measurement of phase scatter. That measurement may be used to evaluate the quality of a communication channel or of portions thereof, such as a record and reproduce system.

Tests performed on the gap scatter detection and reduction circuit of the present invention revealed up to a ten fold reduction in bit error rate in data played back from a magnetic medium, in comparison with the reduction obtained by prior art.

The foregoing objects, advantages and features of the present invention will become apparent from the following detailed description and accompanying drawings.

BRIEF DESCRIPTION OF THE DRAWINGS

FIG. 1 is a block diagram illustrating a preferred embodiment of a phase scatter detection circuit of the invention.

FIG. 2 is a more detailed diagram corresponding to a portion of FIG. 1.

FIG. 3 is a block diagram illustrating a preferred embodiment of a phase scatter reduction circuit of the invention.

FIG. 4 is an alternative embodiment corresponding to a portion of FIG. 2.

FIGS. 5A and 5B are consecutive parts of a detailed schematic circuit diagram corresponding to a portion of FIG. 1;

FIG. 6 shows an example of an output signal characteristic from a phase-scatter detection circuit of the invention, as being dependent on the equalizer adjustment; and FIG. 7 is a flow chart of the operation performed by a portion of the circuit shown in FIG. 3.

DETAILED DESCRIPTION

In the following description like reference numerals will be utilized to designate like elements in all the drawing FIGURES to facilitate comparison.

FIG. 1 shows an example of a portion of a conventional magnetic recording/reproducing channel, including a reproduce head 20 and a preamplifier 22, utilizing the phase scatter detection circuit of the invention. The reproduce head has a playback winding 21 coupled to a preamplifier 22, as well known in the art. The reproduce head 20 detects magnetic flux patterns recorded on a magnetic medium (not shown), such as tape, disk, drum, etc. In this example the signal is recorded in the form of a digital data stream, such as utilizing Miller square code, non-return-to-zero code or any other well known digital code. The output signal from the head 20 is amplified by the preamplifier 22.

An amplitude and phase equalization circuit 24 is coupled to an output 31 of preamplifier 22. As it has been mentioned previously, the circuit 24 compensates for a non-constant amplitude response and/or a non-linear phase response inherent to the recording/playback channel, so that a desired amplitude response which substantially does not change with frequency and a desired phase response which changes substantially linearly with frequency are respectively obtained. The equalizer 24 may be of a well known conventional design. However, preferably a voltage controlled amplitude equalizer of a novel design is utilized which is the subject matter of the above-referenced copending patent application, concurrently filed with this application. The preferred embodiment of the equalizer 24 of FIG. 1 will be described in more detail with reference to FIGS. 5A and 5B.

The equalized signal obtained at the output of equalizer circuit 24 is an analog signal. The amplitude of that signal is limited by a limiter 26 to obtain a digital playback data stream corresponding to the recorded data, as it is well known in the art. The output signal from the limiter 26 is applied via line 34 to a bit synchronization circuit 28. Circuit 28 is of a conventional design and it is known to be utilized with playback equalizers to obtain an internal system reference clock signal which is synchronized to the playback data stream. Particularly, the bit synchronization circuit 28, generally referred to as "bit sync" circuit, generates a reference clock signal on line 36 which is phase locked to the output signal of limiter 26 and which clock signal is generally referred to as reproduce clock signal. In accordance with the present invention a frequency detector 44 is coupled to an output line 40 from a phase detector included in the bit sync circuit 28 to monitor the rate of binary transitions, also referred to as switching frequency, on output line 40. As it has been previously mentioned, the rate of binary transitions on the output line 40 from the phase detector corresponds to the amount of phase scatter of the equalized playback data on line 34. The equalizer 24 may be adjusted at the control inputs 25, 27 to obtain a minimum rate of transitions on line 40 as it will be described later in more detail.

FIG. 2 shows an example of a more detailed circuit diagram of the bit sync circuit 28 and frequency detector 44 of FIG. 1. The bit sync circuit 28 comprises a reference clock signal generator, preferably implemented by a voltage controlled oscillator (VCO) 30 whose output is coupled via line 36 to a digital phase detector 32. In the preferred embodiment a type D flip-flop is utilized as the digital phase detector 32.

The bit sync circuit 28 operates as a well known phase locked loop as follows. The equalized digital signal from the limiter 26 of FIG. 1 is received on line 34 and it is applied to the clock input of flip-flop 32. The D input of flip-flop 32 receives, via line 36, an output signal from the VCO 30. The output signal from the output of the flip-flop 32 is applied via line 42 as a D.C. feedback signal to a control input 41 of the VCO 30 as follows. At every rising edge of the digital data on line 34 which coincides with a high level signal on line 36 from the VCO 30 there is a high level output signal provided on line 42 from the flip-flop 32. Analogously, at every rising edge of the signal on line 34 which is coincident with a low level signal on line 36 from the VCO 30 there is a low output level signal on line 40. As it is well known from the operation bit sync circuits, when the feedback signal on line 42 is positive, the frequency of the VCO output signal on line 36 is reduced. Analogously, the frequency of the signal on line 36 increases when the signal on line 42 is negative.

The resulting output signal on line 36 from VCO 30 is the previously described reproduce clock signal, that is, an internal system reference clock which is phase locked to the equalized playback data stream on line 34. As it is well known, the reproduce clock signal is utilized in conventional signal transmission circuits, including magnetic recording/reproducing circuits, to restore and reclock the reproduced digital data, so that a reproduced signal results which substantially duplicates the originally recorded signal waveform.

It has been discovered by the applicant in accordance with the present invention that the frequency of switching provided by the phase detector output on line 40 is proportional to the amount of phase scatter of the digital signal on line 34. In the preferred embodiment that switching frequency corresponds to the rate of transitions of the bistable signal at the output 40 from flip-flop 32. Consequently in accordance with one aspect of the present invention the frequency of the output signal on line 40 is monitored to detect the amount of phase scatter in the data on line 34. In accordance with another aspect of this invention, the equalizer 24 of FIG. 1 is adjusted to minimize that monitored switching frequency thereby minimizing the phase scatter.

In the preferred embodiment of FIG. 2 an analog frequency detector circuit 44 is utilized to monitor the switching frequency as follows. The frequency detector 44 is preferably implemented by a constant area pulse generator 48, and an integrator 50. A differential voltmeter 46 is coupled to an output of the integrator 50. The constant area pulse generator 48 comprises two transistors 52, 53 for example type 2N2222 which are connected to operate as a current mode switch as follows. The emitters of transistors 52, 53 are connected to a negative DC voltage source via a resistor 55. The collector of one transistor 52 is grounded, and the collector of the other transistor 53 is connected to one terminal of an inductor 54 whose other terminal is grounded. The base of transistor 52 receives the previously described output signal on line 40 from flip-flop 32. The base of transistor 53 is connected to a DC bias voltage which is midpoint in the logic level range of the flip-flop 32. That mid point is obtained as a junction between two series resistors 95, 96 connected between the DC bias voltage and ground. The junction 58 between the collector of transistor 53 and inductor 54 is connected to an input of a diode 57.

In operation the constant area pulse generator 48 receives the output pulses on line 40 from the flip-flop 32. When the voltage on line 40 is negative, the transistor 52 is not conducting and the inductor 54 is charged to a current via transistor 53. When the voltage on line 40 is positive, transistor 52 conducts while transistor 53 is non-conducting. The current stored in inductor 54 is then discharged through diode 57 into the integrator 50. Consequently every time there is a voltage change on line 40 from negative to positive, a positive voltage spike is formed at junction 58, corresponding to the discharging of inductor 54. These voltage spikes represent constant area pulses. The diode 57 rectifies the signal at junction 58 so that only the positive voltage spikes are applied to the integrator 50.

The integrator 50 has a series resistor 61 connected between a parallel resistor 60 and a parallel capacitor 62. The other terminals of the resistor 60 and capacitor 62, are grounded. The junction between resistors 60, 61 is connected to an output of diode 57. The integrator 50 receives the above-described constant area output pulses via the diode 57 and it provides on line 63 a D.C. output signal whose magnitude is proportional to an average area of these constant area pulses per unit of time. Because each pulse has a constant area, the amplitude of the output signal on line 63 is proportional to the number of occurrences of these pulses per unit of time, that is, to the frequency of these pulses, as it is well known. To detect the magnitude of the output signal on line 63 from integrator 50 a conventional differential voltmeter 46, for example type 825A made by Fluke Manufacturing Company, is preferably utilized. The voltmeter provides a voltage corresponding to the amplitude of the signal on line 63, which in turn is proportional to the rate of binary transitions, or switching frequency, at the output 40 from phase detector 32.

As an example, in the preferred embodiment of the invention the frequency of the output signal on line 36 from the VCO 30 has been selected as 66 MHz and the output signal frequency on line 40 from the phase detector 32 has been typically 1.3 MHz.

In accordance with the preferred embodiment of FIGS. 1 and 2 the output signal from the integrator 50, which corresponds to the rate of transitions of the bistable signal on line 40, is monitored by the differential voltmeter 46. The equalizer 24 of FIG. 1 may be adjusted via its control lines 25 and 27 to minimize the monitored signal. As it has been previously described, a minimum value of the monitored signal corresponds to minimum phase scatter and thus minimum bit error rate of the equalized playback data stream on line 34.

The foregoing operation is illustrated by the way of example in FIG. 6 showing a characteristic 65 of signal values monitored by the differential voltmeter 46 of FIG. 2 as being dependent on the adjustment of the equalizer 24 of FIG. 1. Point A on the characteristic 65 corresponds to minimum voltage displayed on the voltmeter 46 and thus to a minimum phase scatter of the equalized signal on line 34.

It follows from the foregoing description that in the preferred embodiment of FIGS. 1 and 2 the bit error rate is minimized by monitoring the rate of binary transitions at the output of the phase detector 32 by the frequency detector 44 and by adjusting the equalizer 24 accordingly to keep that rate at a minimum. As an example, in the preferred embodiment a typical voltage range obtained between a maximum and minimum voltage value B and C of the characteristic 65 is ten milivolts.

An example of a detailed circuit diagram including the equalizer 24, limiter 26, bit sync circuit 28 and frequency detector 44, is shown in consecutive FIGS. 5A and 5B and will be described below. In the preferred embodiment of FIGS. 5A, 5B the equalizer 24 comprises a voltage controlled cosine amplitude equalizer 152 and an adjustable phase equalizer 171. The voltage controlled amplitude equalizer is the subject matter of the above-referenced concurrently filed copending patent application and it is described therein in detail.

The circuit of FIGS. 5A and 5B operates as follows. An input terminal 31 in FIG. 5A, corresponding to line 31 of FIG. 1, is coupled to receive an output signal from the preamplifier 22 of FIG. 1, obtained as a playback signal from a magnetically recorded digital signal as previously described. The input signal on line 31 is buffered by a conventional buffer amplifier 155, comprising transistors 156, 157, to obtain a low driving impedance for the following amplitude equalizer 152.

The voltage controlled cosine equalizer 152 comprises a delay line 126 and a differential amplifier 122 implemented by transistors 136, 137 whose collectors are coupled to a positive voltage supply via respective resistors 201 and 138. These collectors represent differential outputs 144, 244 of the equalizer. The emitters of transistors 136, 137 are each connected via a series resistor 139, 140 to one terminal of a current source 142. The other terminal of the current source 142 is coupled to a negative DC voltage supply. The base of transistor 136 forms a non-inverting input 124 while the base of transistor 137 forms an inverting input 134 of the differential amplifier 22.

The current source 142 is implemented in a well known manner by a transistor 160 having its collector connected to the emitters of transistors 136, 137, via respective resistors 139, 140. The emitter of transistor 160 is connected to a negative D.C. voltage supply via a series resistor 163. The base of transistor 160 is connected to that voltage supply via a voltage divider comprising series resistors 161 and 162 of which resistor 161 is grounded.

The delay line 126 is connected to the non-inverting input 124 of the differential amplifier 122. A voltage divider comprising resistor 200 in series with potentiometer 132 and resistor 153 is connected to the input of the delay line 126. The inverting input 134 of the differential amplifier 122 is connected to an adjustable wiper contact of the potentiometer 132.

A voltage controlled amplifier 146 is connected in parallel with the signal path provided between the inverting input 134 and output 144, 244 of the differential amplifier 122. The voltage controlled amplifier has two transistors 148, 149 which have their emitters connected together to a negative D.C. voltage supply via a control transistor 150. The base of transistor 149 is connected to the voltage divider 132, 153. The base of the transistor 148 is grounded. The collector of transistor 148 is connected to the collector of transistor 136. The collector of the transistor 149 is connected to the collector of transistor 137. The collectors of transistors 136, 148 and 137, 149 represent the previously mentioned differential output 144 and 244 of the equalizer 152. The collector of the control transistor 150 is connected to interconnected emitters of transistor 148, 149 and its emitter is connected via a current setting resistor 151 to the negative D.C. voltage supply.

The base of the control transistor 150 provides a control input 25 for receiving a control voltage Vc. By varying the control voltage Vc applied to control input 25 the amount of current flowing through the transistors 148 and 149 of the voltage controlled amplifier 146 varies. The gain of amplifier 146 is thus controlled by that control voltage. The respective differential outputs from the differential amplifier 122 and voltage controlled amplifier 146 are summed at the outputs 144, 244 from the voltage controlled amplitude equalizer 152. The thusly obtained output signal from the equalizer 152 on lines 144, 244 has a variable boost of the frequency response characteristic in response to the control voltage at 25. The control voltage on line 25 may be applied from a remote location or, for example, automatically by computer control, as it will be described further. The transistors 136, 137 and 148, 149 are selected such that the signal delays in the respective signal paths through transistors 136, 137 are substantially equal to the delays provided by the parallel path through transistors 148 and 149. A resulting proper timing of the respective signals summed at the outputs 144, 244 is thereby obtained.

In the preferred embodiment of FIG. 5A the delay line 126 is implemented by a 15 nanosecond delay line, type MD015Z100 and the transistors 136, 137, 148, 149, 150 and 160 are type 2N4259.

The voltage controllable range of adjustment of the equalization circuit of FIG. 5A is set by proper selection of resistor values 200, 132, 151 and 153. Decreasing the ratio of resistance values R2/R1, where R1 is the combined value of resistors 132, 200 and R2 is the value of resistor 153 or, alternatively, decreasing the value R3 of resistor 151 will increase the voltage controllable range. However, in most applications it is desirable to limit that range to avoid harmonic distortion caused by the voltage controlled amplifier 146. Limiting the voltage controllable range also prevents the system from being accidentally adjusted too far from its proper setting.

In operation the boost of the cosine equalizer 152 can be remotely controlled by varying the voltage Vc at the control input 25. In addition to the remote control, the boost may be controlled also manually by the potentiometer 132. For example, the potentiometer 132 may be adjusted to obtain a coarse value of a desired boost and a fine boost adjustment may be obtained by the control voltage at 25. The coarse range of boost adjustment may be selected an order of a magnitude greater than the fine range. It is seen from the foregoing description that the gain of the voltage controlled amplifier 146 is dependent on the current supplied by transistor 150 which is in turn controlled by its base voltage Vc.

The previously mentioned phase equalizer 171 is connected to the amplitude equalizer 152 via lines 144, 244, each connected to the collector of one transistor 136, 137 of the voltage controlled amplifier 122, as previously described. The phase equalizer 171 is of a well known type. The phase versus frequency characteristic of the phase equalizer is adjusted by varying the control voltage at input 27, which in turn varies the bias voltage and thus the capacitance of varactor diodes 204, 205.

The resulting amplitude and phase equalized output signal on line 182 from the equalizer 24 of FIG. 5A is applied to a buffer amplifier 183, comprised of transistors 184, 185 and 186 connected in series. Buffer amplifier 183 provides a stable impedance to drive a low pass filter 188.

The output signal on line 187 from the buffer amplifier 183 is applied to the low pass filter 188, which is of conventional design and includes a number of consecutive filter stages for removing frequencies above the useful signal range from the equalized signal, as it is well known in the art.

With further reference to FIG. 5B, the thusly filtered signal from low pass filter 188 is applied via line 189 to the limiter 26 which has a conventional design. The limiter 26 comprises a differential amplifier 190 having one input coupled to receive the equalized signal on line 189 and another input connected to a predetermined reference voltage. The resulting amplitude-limited signal on line 34 from limiter 26 is applied to the clock input of the flip-flop 32 as previously described with reference to FIG. 2.

FIG. 5B also shows the voltage controlled oscillator 30, further referred to as VCO 30, of FIG. 2 in more detail. The VCO 30 is part of the phase locked loop 28 shown in FIGS. 2 and 4.

FIG. 3 shows an example of a phase scatter reduction circuit of the invention in which a control circuit 70 is utilized to provide an optimum adjustment of the equalizer 24 to obtain minimum phase scatter. The control circuit 70 is preferably implemented by a microprocessor and memory circuit. It has an input which receives via line 74 an output signal from the frequency detector 44. This frequency detector may be implemented by an analog circuit, such as 44 of FIG. 2. Alternatively, it may be implemented by a digital circuit, as shown at 71 in FIG. 4 and as it will be described below.

The digital frequency detector 71 of FIG. 4 receives an output signal on line 40 from the previously described digital phase detector 32 whose switching frequency is to be detected. The signal on line 40 is applied to one input of an AND gate 75. The other input of AND gate 75 is coupled to receive a control signal on line 76. The control signal is applied to turn on the gate 75 for a predetermined time interval, for example 100 miliseconds. During that interval the transitions of the bistable signal on line 40 pass to the output 78 of the AND gate 75. The signal on line 78 is applied to a digital counter 72, which provides a count corresponding to the total number of transitions obtained during the predetermined time interval.

The output signal on parallel output lines 74 from the counter 72 corresponds to the switching frequency of the digital phase detector 32. Thus, the signal on lines 74 corresponds to the amount of phase scatter of the equalized signal.

With further reference to FIG. 3, the output signal from the counter 72 on lines 74 is applied to the microprocessor and memory circuit 70. The counter 72 is then reset to zero via line 80 shown in FIG. 4 and it is ready to be turned on for another predetermined interval in response to a control signal on line 76. The foregoing operation cycle may be continuous or may be repeated intermittently.

Alternatively, when the analog frequency detector 44 is utilized, circuit 70 may include a known analog-to-digital converter (not shown) to convert the analog signal on line 74 into a digital signal in a well known manner.

Because the characteristic of the output signal frequency from the phase detector 32 as being dependent on the equalizer adjustment is not a monotonic function, as it is shown in FIG. 6, it is necessary to provide a number of trial adjustment values, so that an optimum adjustment value may be determined which corresponds to a minimum phase scatter. The foregoing may be obtained by applying in sequence a number of discrete adjustment signal values to control inputs 25, 27 of equalizer 24 in a selected range of adjustment values, so that a desired optimum adjustment may be determined. That optimum adjustment value corresponds to point A of the characteristic in FIG. 6 as it has been described previously.

An example of operation of the circuit of FIG. 3 is described below with reference to a flow chart shown in FIG. 7. As it is depicted by block 220 of FIG. 7, predetermined trial adjustment control voltage values within a selected control voltage range are stored by circuit 70 and applied therefrom via line 25 to the equalizer 24. The voltage on line 25 is received by a control input of a voltage controlled amplitude equalizer, such as has been previously described and shown at 152 in FIG. 5A. The corresponding output signal from the frequency detector 44 or 71 for each control voltage value on line 25 is detected and the detected value is applied via line 74 and stored in a memory of the microprocessor and memory circuit 70. As shown by block 221 of the flow chart, the stored output signal values are compared with each other and a minimum stored value is found. If a valid minimum stored value is found, corresponding to an inflection point shown at A in the characteristic curve 65 of FIG. 6, as depicted by block 222 of the flow chart, an optimum control voltage value which corresponds to the valid minimum stored value is then applied via line 25 to adjust the equalizer 24. If such a valid minimum value is not found, the above-described operation is repeated for a different set of control voltage values Vc within a different range, as shown by block 223, until the valid minimum value is determined.

Preferably the microprocessor is programmed in a well known manner to perform the above-described operation. After determining an optimum value for the equalizer adjustment, the microprocessor automatically sets the equalizer 24 via control input 25 to that optimum value, as shown by block 224 of FIG. 7.

In case the equalizer has more than one adjustable control input, such as an additional control input 27 shown in FIG. 3, corresponding to the adjustable input of the phase equalizer 171, the above-described operation is repeated for each additional control input as it is indicated by block 225.

It follows from the foregoing description that in the embodiment of FIG. 3 the microprocessor is programmed to detect an optimum control signal value for adjusting the equalizer to obtain a minimum phase scatter value. The equalizer is than automatically adjusted by the microprocessor to that detected value.

Alternatively, the control circuit 70 of FIG. 3 may be deleted as it is shown in FIGS. 1 or 2, and the output signal of the digital frequency detector 71 may be monitored on a visual or audible display. The equalizer 24 may then be adjusted manually via lines 25, 27 as it has been previously described with respect to FIG. 1.

While the invention has been particularly shown and described with reference to embodiments thereof, it will be appreciated that various alternatives and modifications may be made which fall within the scope of the appended claims.

What is claimed:

1. Apparatus for detecting phase scatter in a digital signal transmitted over a channel, said channel having a non-constant amplitude response and/or non-linear phase response, comprising:
   an equalization circuit having an input coupled to receive said transmitted signal and an output, said equalization circuit being coupled to provide an equalized signal and having a response which compensates for said channel response;
   a phase locked loop coupled to provide a reference signal synchronous with said equalized signal, said phase locked loop comprising a reference clock signal generator means having an output coupled to provide a reference clock signal, and a phase detector means having a first input coupled to receive said reference clock signal and a second input coupled to receive said equalized signal, said phase detector means having an output providing a bistable output signal corresponding to a phase difference between said signals at said first and second input thereof, said output of the phase detector means being coupled to a control input of said signal generator means to control the frequency of said reference clock signal provided thereby; and
   frequency detector means coupled to said output of said phase detector means for monitoring a rate of transitions of said bistable output signal.

2. The apparatus of claim 1 wherein said equalization circuit has a control input coupled to receive a control signal for adjusting said amplitude or phase response thereof, said apparatus further comprising a control means having an input coupled to receive an output signal of said frequency detector means and having an output coupled to said control input of said equalization circuit and wherein said control means is coupled to detect an optimum control signal value corresponding to a minimum input signal value obtained from said frequency detector means and to apply said optimum value to said control input of the equalization circuit.

3. The apparatus of claim 2 wherein said control means is a programmable microprocessor and memory means.

4. The apparatus of claim 1 wherein said frequency detector means comprises a constant area pulse generator means having an input coupled to said output of the phase detector means for providing constant area pulses corresponding to said signal transitions obtained from said phase detector means, an integrator means having an input coupled to receive said constant area pulses, said integrator means coupled to provide an output signal proportional to a frequency of said constant area pulses.

5. The apparatus of claim 1 wherein said frequency detector means comprises a gate means and counter means, said gate means having a first input coupled to receive said bistable output signal of said phase detector means and a second input coupled to receive a control signal, said gate means having an output coupled to an input of said counter means, and wherein said gate means is coupled to apply said bistable output signal to said counter means in response to said control signal applied to said second input.

6. The apparatus of claim 1 wherein said equalization circuit further has a control input coupled to receive a control signal for adjusting said amplitude or phase response thereof to obtain a minimum output signal value from said frequency detector means.

7. The apparatus of claim 6 wherein said equalization circuit comprises a voltage controlled amplifier means having a control input corresponding to said control input of said equalization circuit and wherein said control signal is applied to adjust a gain of said voltage controlled amplifier means, thereby adjusting said amplitude response provided by said equalization circuit.

8. The apparatus of claim 6 further comprising a control means having an input coupled to receive an output signal of said frequency detector means and having an output coupled to said control input of said equalization circuit, said control means being coupled to apply respective control signal values to said control input of said equalization circuit and to detect an optimum control signal value corresponding to a minimum signal value obtained from said frequency detector means.

9. The apparatus of claim 8 wherein said control means is further coupled to apply said detected optimum control signal value to said control input of said equalization circuit.

10. Apparatus for reducing phase scatter in a digital signal transmitted over a channel, said channel having a non-constant aplitude response and/or non-linear phase response, comprising:
an equalization circuit having an input coupled to receive said transmitted signal, an output and a control input, said equalization circuit being coupled to provide an equalized signal and having a response which compensates for said channel response;
a phase locked loop coupled to provide a reference signal synchronous with said equalized signal, said phase locked loop comprising a reference clock signal generator means having an output coupled to provide a reference clock signal, and a phase detector means having a first input coupled to receive said reference clock signal and a second input coupled to receive said equalized signal, said phase detector means having an output providing a bistable output signal corresponding to a phase difference between said input signals thereof, said output of the phase detector means being coupled to a control input of said signal generator means to control the frequency of said reference clock signal provided thereby;
frequency detector means coupled to said output of said phase detector means for monitoring a rate transitions of said bistable output signal; and
control means having an input coupled to receive an output signal of said frequency detector means and having an output coupled to said control input of said equalization circuit for adjusting said amplitude or phase response thereof to obtain a minimum rate of said transitions of said bistable signal monitored by said frequency detector means.

11. The apparatus of claim 10 wherein said control means is coupled to apply respective control signal values to said control input of said equalization circuit and to detect and store respective output signal values obtained from said frequency detector means in response to said control signal values and wherein said control means is further coupled to detect an optimum control signal value corresponding to a minimum output signal value from said frequency detector means, and to apply said optimum control signal value to said control input of said equalization circuit.

12. The apparatus of claim 10 wherein said control means is a programmable microprocessor and memory means.

13. A method of detecting phase scatter in a digital signal transmitted overa channel having a non-constant amplitude response and/or mon-linear phase response, comprising the steps of:
equalizing said transmitted signal to compensate for said responses of said channel;
generating a reference clock signal synchronized with said equalized transmitted signal, while detecting a phase difference between said reference clock signal and said equalized transmitted signal and providing a bistable control signal corresponding to a polarity of said phase difference, and applying said bistable control signal as a direct current signal to control the frequency of said reference clock signal; and
monitoring the rate of transitions of said bistable signal, thereby monitoring the amount of phase scatter.

14. A method of reducing phase scatter in a digital signal transmitted over a channel having a non-constant amplitude response and/or non-linear phase response, comprising the steps of:
equalizing said transmitted signal to provide an equalization response compensating for said responses of said channel;
generating a reference clock signal synchronized with said equalized transmitted signal, while detecting a phase difference between said reference clock signal and said equalized transmitted signal and providing a bistable control signal corresponding to a polarity of said phase difference, and applying said bistable control signal as a direct current signal to control the frequency of said reference clock signal;
monitoring the rate of transistions of said bistable signal, thereby monitoring the amount of phase scatter; and
applying a variable control signal to vary said equalization response to minimize said monitored rate of transitions of said bistable signal.

15. A method of reducing plase scatter in a digital signal transmitted over a channel having a non-constant amplitude response and/or non-linear phase response, comprising the steps of:
equalizing said transmitted signal to provide an equalization response compensating for said responses of said channel;
generating a reference clock signal synchronized with said equalized transmitted signal, while detecting a phase difference between said reference clock signal and said equalized transmitted signal and providing a bistable control signal corresponding to a polarity of said phase difference, and applying said bistable control signal as a direct current signal to control the frequency of said reference clock signal;

monitoring the rate of transitions of said bistable control signal, thereby monitoring the amount of phase scatter;

applying variable control signal values to vary said equalization response and monitoring said transition rates obtained in response to said control signal values; and selecting an optimum control signal value which corresponds to a minimum monitored transition rate and applying said optimum control signal value to adjust said equalization response.

16. The method of claim 15 wherein the step of applying control signal values includes storing in a memory means said control signal values and said transition rates obtained in response to said values and wherein said step of selecting an optimum control signal value comprises comparing said stored transition rates and selecting said optimum control signal value as corresponding to a minimum stored transition rate.

* * * * *

UNITED STATES PATENT AND TRADEMARK OFFICE
CERTIFICATE OF CORRECTION

PATENT NO.   : 4,615,037
DATED        : September 30, 1986
INVENTOR(S)  : Alan J. Adler It is certified that error appears in the above-identified patent and that said Letters Patent is hereby corrected as shown below:

Column 11, line 41, "aplitude" should read --amplitude--;

Column 11, line 66, before "transitions", insert --of--;

Column 12, line 21, "overa" should read --over a--;

Column 12, line 22, "mon-linear" should read --non-linear--;

Column 12, line 60, "plase" should read --phase--.

Signed and Sealed this

Twenty-fourth Day of November, 1987

*Attest:*

DONALD J. QUIGG

*Attesting Officer*   *Commissioner of Patents and Trademarks*